US007664495B1

(12) United States Patent
Bonner et al.

(10) Patent No.: US 7,664,495 B1
(45) Date of Patent: Feb. 16, 2010

(54) VOICE CALL REDIRECTION FOR ENTERPRISE HOSTED DUAL MODE SERVICE

(75) Inventors: Thomas Wayne Bonner, Smyrna, GA (US); Nhan Thanh Tran, Lawrenceville, GA (US); Mark Enzmann, Roswell, GA (US); Simon Richardson, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 624 days.

(21) Appl. No.: 11/295,179

(22) Filed: Dec. 5, 2005

Related U.S. Application Data

(60) Provisional application No. 60/674,156, filed on Apr. 21, 2005.

(51) Int. Cl.
*H04L 12/28* (2006.01)
(52) U.S. Cl. .................. 455/433; 455/445; 370/338; 370/352
(58) Field of Classification Search .............. 370/356, 370/352, 354, 355, 338, 360; 455/417, 435.1, 455/433, 445, 435.2, 432.2, 440, 432.1, 41.2, 455/552.1
See application file for complete search history.

(56) References Cited

U.S. PATENT DOCUMENTS

| 5,307,400 | A | * | 4/1994 | Sawyer et al. ............ 455/456.1 |
| 5,490,201 | A | * | 2/1996 | Moberg et al. ............... 455/433 |
| 5,913,166 | A | * | 6/1999 | Buttitta et al. ............... 455/436 |
| 6,058,311 | A | * | 5/2000 | Tsukagoshi .............. 455/435.1 |
| 6,278,707 | B1 | | 8/2001 | MacMillan et al. |
| 6,347,085 | B2 | | 2/2002 | Kelly |
| 6,381,456 | B1 | * | 4/2002 | Ko ........................... 455/435.1 |
| 6,725,044 | B2 | * | 4/2004 | Verma et al. ................. 455/444 |
| 6,735,621 | B1 | | 5/2004 | Yoakum et al. |
| 6,741,695 | B1 | | 5/2004 | McConnell et al. |
| 6,957,065 | B1 | * | 10/2005 | Lindholm ................... 455/433 |
| 7,027,433 | B2 | * | 4/2006 | Tuohino et al. ............. 370/352 |
| 7,079,511 | B2 | * | 7/2006 | Abrol et al. ................. 370/331 |
| 7,177,636 | B2 | * | 2/2007 | Oda et al. ................. 455/426.1 |
| 7,379,436 | B2 | * | 5/2008 | Jiang ......................... 370/328 |
| 7,395,085 | B1 | * | 7/2008 | Mauer et al. .............. 455/552.1 |
| 7,426,265 | B2 | * | 9/2008 | Chen et al. ............. 379/211.02 |
| 2002/0094811 | A1 | * | 7/2002 | Bright et al. ................. 455/433 |
| 2002/0101859 | A1 | * | 8/2002 | Maclean ..................... 370/352 |
| 2002/0147008 | A1 | * | 10/2002 | Kallio ........................ 455/426 |

(Continued)

*Primary Examiner*—Kent Chang
*Assistant Examiner*—Brandon J Miller
(74) *Attorney, Agent, or Firm*—Parks IP Law LLC; Jonathan A. Paulis

(57) ABSTRACT

Systems and methods provide a single E.164 number for voice and data call redirection and telephony services such as caller identification, regardless of in which type of network a dual mode mobile device operates. When the dual mode device registers and is active in a GSM network, temporary routing and status updates are triggered and resultant information is maintained in both networks. A mobile terminated call is routed through an enterprise WLAN with call control within the enterprise being handled by SIP or H.323 signaling, and the call is redirected to the mobile device in the GSM network, where call control is assumed by the SS7 network. Services are provided using the protocols native to the active network, and the single E.164 is used consistently along with or lieu of the temporary routing information for subscriber identity specific functions, such as caller identification and voice mail.

15 Claims, 4 Drawing Sheets

U.S. PATENT DOCUMENTS

| | | | |
|---|---|---|---|
| 2004/0095945 A1* | 5/2004 | Woog | 370/401 |
| 2004/0162105 A1* | 8/2004 | Reddy et al. | 455/551 |
| 2004/0190498 A1 | 9/2004 | Kallio et al. | |
| 2004/0264410 A1* | 12/2004 | Sagi et al. | 370/331 |
| 2005/0041640 A1* | 2/2005 | Nasielski et al. | 370/352 |
| 2005/0058125 A1* | 3/2005 | Mutikainen et al. | 370/354 |
| 2005/0091407 A1 | 4/2005 | Vaziri et al. | |
| 2005/0261006 A1* | 11/2005 | Hirsbrunner et al. | 455/457 |
| 2006/0099935 A1* | 5/2006 | Gallagher et al. | 455/414.1 |
| 2006/0120351 A1* | 6/2006 | Rajagopalan | 370/352 |

* cited by examiner

Indirect SS7 Delivery via Home SMSC

Direct SS7 Delivery via Foreign SMSC

VOICE CALL REDIRECTION FOR ENTERPRISE HOSTED DUAL MODE SERVICE

RELATED APPLICATION

This application claims the benefit of U.S. Provisional Application Ser. No. 60/674,156, entitled "Voice Call Redirection for Enterprise Hosted Dual Mode Service," filed on Apr. 21, 2005, the entirety of which is incorporated by reference herein.

TECHNICAL FIELD

This invention relates generally to telecommunications, and more particularly, to systems and methods for redirecting calls to an enterprise-hosted dual mode service device operating interchangeably in packet-switched and circuit-switched networks.

BACKGROUND OF THE INVENTION

Convergence of wireless local area networks (WLANs) and third-generation wireless wide area networks will enable mobile devices to roam between a packet-switched network and a circuit-switched network, such as for example, between an 802.11 Wi-Fi network and a public wireless voice/data telecommunications network. This flexibility has inherent advantages, for example, enabling wireless providers to bundle in calls across WLAN spectrum to close gaps in wireless coverage, using the relatively higher bandwidth of the WLAN for data transfers and the relatively lower bandwidth of a wireless air interface such as GSM for voice traffic, extending mobile coverage inside buildings or whenever a user with in range of a WLAN, and providing user access to Voice over Internet Protocol (VoIP) technology to save money or wireless plan minutes. In sum, this notion of wireless convergence promises the ability for an end user to secure an optimal connection to a communications network regardless of the end user's location. Potential applications include domestic services that allow a single access point in a home to serve several handsets that are also used outside the home, and enterprise services that target office environments having a WLAN that serves potentially many access points as well as telephones routed through the office PBX.

To benefit from the advantages of wireless convergence, a mobile device such as a telephone or a Personal Digital Assistant (PDA) must be capable of dual mode or dual network operation. Incoming calls are redirected to dual mode devices regardless of in which network the device is operating, and the dual mode devices then have the ability to handoff between a WLAN and a wireless network as needed. Roaming protocols are required to facilitate handing off between the circuit-switched wireless domain and the packet-switched domain of the WLAN.

Existing and proposed call redirection and handoff solutions disadvantageously must anchor an enterprise-hosted call in the enterprise at all times. For example, the 802.11a based Motorola SCCAN solution provides a proxy engine that controls handoff using two directory numbers and a simple call forwarding protocol that relies on the mobile device and a GSM radio link. Such solutions maintain a first directory number that routes to a wireline network and a second published mobile directory number that is also routable. Expending two directory numbers has the added drawback of complicating or thwarting the provision of a single caller identifier to Caller ID systems. If a call originates from a dual mode device operating in an enterprise network, the first directory number is revealed; if the call originates operating in the wireless network, the second directory number is revealed.

SUMMARY OF THE INVENTION

The various embodiments of the present invention provide an interworking protocol for redirecting calls directed to enterprise-hosted dual mode devices operating in both a packet-switched environment, such as an enterprise WLAN (Wireless Local Area Network) and a wireless telecommunications network, such as a GSM (Global System for Mobile Communications) network. The interworking protocol uses the roaming procedures developed for existing wireless telecommunications networks along with protocols that set up, maintain, and terminate real-time voice and multimedia sessions over packet-switched networks, such as the Session Initiation Protocol (SIP) described in the Internet Engineering Task Force (IETF) RFC 2543: *"Session Initiation Protocol"*, the H.323 protocol specified by the International Telecommunication Union Telecommunication Standardization (ITU-T) Study Group 16, and the like. The specifications for SIP and H.323 are incorporated herein by reference. In this manner, the systems and methods of the invention provide true interworking for services typically offered in wireless and enterprise-based communications networks such as Caller Identification (Caller ID) and Voice over Internet Protocol (VoIP).

The present invention provides systems and methods for redirecting incoming (mobile terminated) calls to wireless devices such as dual mode handsets (DMH), and provides services such as Caller ID and the like, utilizing a single dialable address such as an E.164 number that is functional in either network environment. In the exemplary embodiments, call control is achieved by using network specific call processing protocols such as H.323 or SIP in the packet-switched network and Signaling System 7 (SS7) Mobile Application Part (MAP) in the GSM network.

Generally described, the enterprise hosted converged services concept of the present invention includes a limited enterprise-based IP Multimedia Subsystem (IMS) platform that is common to and that interworks with a wireless IMS platform, and that can function independently without relying on external networks for call control. The common IMS platform supports the wireless, enterprise, and domestic services networks. In the exemplary embodiments, a wireless network hosts the IMS elements to support wireless and the domestic services network. A WLAN within the enterprise hosts at least a subset of the IMS elements to support the enterprise network, providing at least limited functionality needed to interwork with the wireless network's IMS elements for voice call redirection.

According to one aspect, each subscriber is allocated a globally unique, language independent dialable subscriber identifier such as a 16 digit number conforming to ITU-T Recommendation E.164, which is incorporated herein by reference. The E.164 subscriber identifiers can be hosted at any suitable switching center housed in a physical structure hereinafter referred to as the serving wire center, and are identified in a master database that corresponds to a geographic area used by the local exchange carrier to set rate boundaries for billing and for issuing phone numbers, commonly referred to as a rate center. The master database is queried each time the DMH receives a call, and responds to such queries by providing routing information necessary to deliver the call to the DMH regardless of in which network the DMH is operating.

In the exemplary embodiments, the E.164 numbers are hosted in the serving wire center for the enterprise, which receives wireline service from a service provider commonly referred to as a Telco. The E.164 numbers gateway, or route directly into the enterprise, and reside in databases in both the wireless network and the enterprise WLAN. In implementations incorporating Local Number Portability (LNP) or number pooling, the switching systems of the serving wire center also support Local Roaming Number (LRN) functionality. When the DMH hands off from the enterprise WLAN to the wireless network, the wireless network treats the DMH as a regular subscriber or an extended roamer. In other words, the incoming call is routed initially through the wireline network, but is also provisioned in the wireless network. This is in contravention with preexisting wireless protocols wherein, in order for an E.164 number to be routed by a wireless network, it must be hosted in the wireless operator and not a wireline. Calls may be initially routed through either network, depending on the exigencies of the application.

Accurate caller identification services for DMH originated calls are provided by provisioning the enterprise WLAN as a Mobile Virtual Network Operator (MVNO) by allocating E.164 numbers to the enterprise WLAN that route directly from the PSTN to the enterprise switching system, such as a private branch exchange (PBX). In alternative embodiments, all mobile originated calls are routed through an IMS telephony application server that replaces the wireless network based caller identifier with an enterprise based caller identifier.

According to another aspect, calls follow the DMH regardless of whether the DMH is operating in the enterprise WLAN or the wireless network, and without the risk inherent with allowing the enterprise WLAN access to the wireless network's SS7 network. Rather, SIP signaling is used to redirect calls into the wireless network.

The foregoing has broadly outlined some of the aspects and features of the present invention, which should be construed to be merely illustrative of various potential applications of the invention. Other beneficial results can be obtained by applying the disclosed information in a different manner or by combining aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

Figure 1:
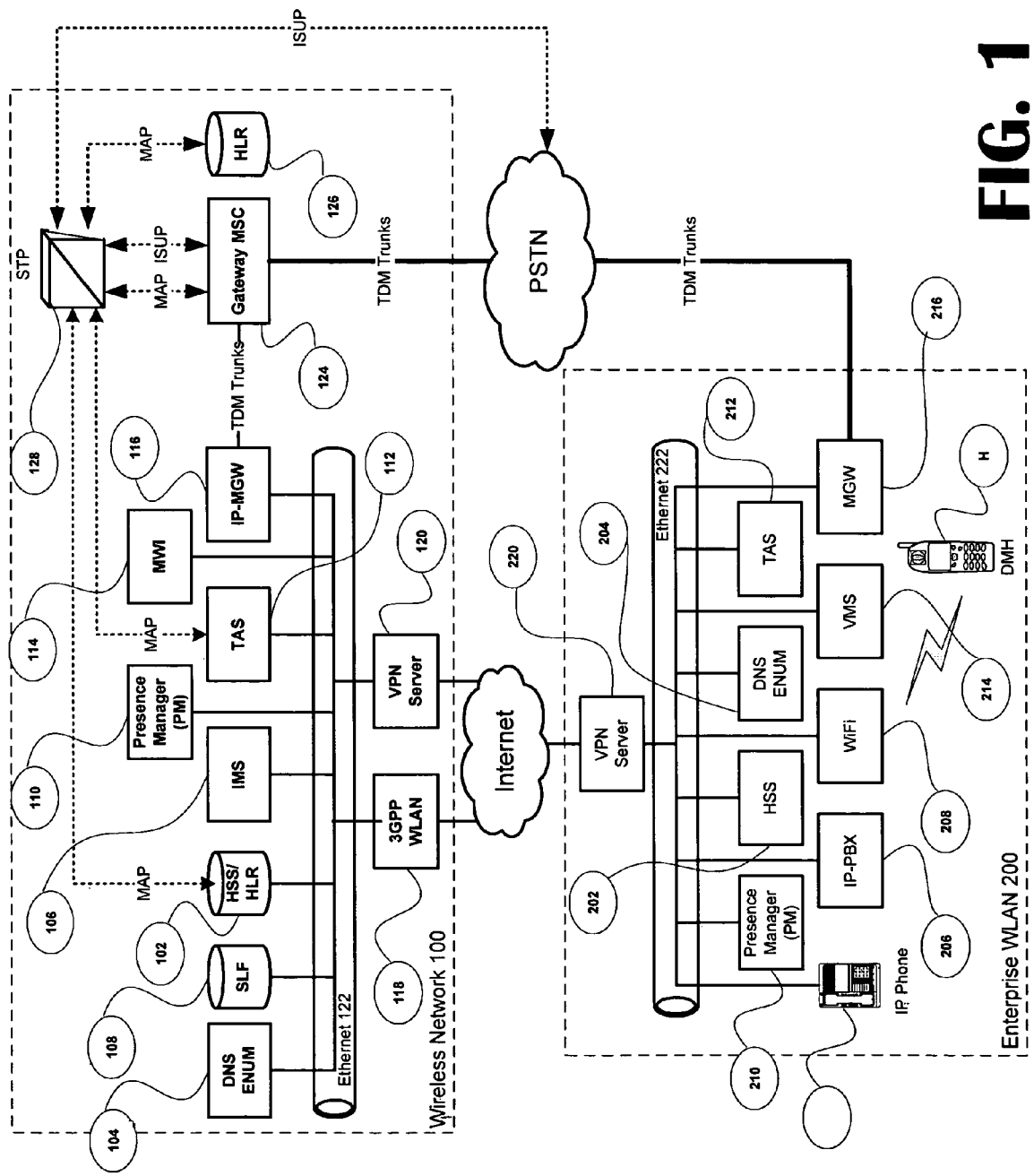
FIG. 1 is a block diagram showing an exemplary environment for the various embodiments of the invention.

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known systems or methods have not been described in detail to avoid obscuring the present invention. Therefore, specific structural, architectural, and functional details disclosed herein are not to be interpreted as limiting, but as a basis for the claims and for teaching one skilled in the art to variously employ the present invention.

Referring now to the drawings in which like numerals indicate like elements throughout the several views, the drawings illustrate certain of the various aspects of exemplary embodiments of systems and method for implementing call redirection and related services in converged wireless networks.

For the purposes of teaching the principles of the invention, and not of limitation, the exemplary embodiments and corresponding voice call flows are described in the context of using PSTN circuit-switched bearers to redirect calls between a Public Land Mobile Network (PLMN) 100 (e.g., a GSM network) and an enterprise-based data transmission system, shown as WLAN 200, although the systems and methods of the invention can be implemented to provide packet-switched and circuit-switched interworking between in any disparate wireless networks, including any known or yet to be developed wireless voice and data transmission systems.

WLAN 200 may be operated by any entity, including but not limited to: a 3G PLMN operator; a public network operator (e.g., a public WLAN operator) who is not a 3G PLMN operator; an entity that provides WLAN access in a local area (i.e., a building manager/owner) but is otherwise not a public network operator; or a business organization that provides a WLAN for its internal use and wishes to allow interconnection and use by employees or visitors. For simplicity, the exemplary WLAN 200 will be described as being operated by an entity hereinafter referred to as an enterprise.

FIG. 1 shows certain elements of the exemplary environment for implementing the present invention. The exemplary HPLMN 100 hosts a wireless IP multimedia subsystem (IMS) 106 platform by incorporating or interfacing with physical and functional entities such as a master subscriber database, shown as Home Subscriber Server Home Location Register (HSS/HLR) 102, a subscription location function (SLF) 108, a presence manager (PM) 110, a telephony application server 112, a message waiting indicator (MWI) 114 service, an IP message gateway (IP-MGW) 116, a 3GPP (3rd Generation Partnership Project) or 3GPP2 WLAN subsystem 118, and a packet data gateway (PDG) 120 (e.g., a virtual private network (VPN) server), all of which are interconnected via a suitable data link medium 122, such as Ethernet, Wi-Fi, Token Ring, and the like. Wi-Fi access to the IMS 108 is provided by the 3GPP WLAN Subsystem 118.

HSS/HLR 102 manages subscriber profiles, authenticates users, implements SIP protocols for call routing, and provides HLR and Visitor Location Register (VLR) functionality. The HSS/HLR 102 may incorporate several physical databases that maintain variables and identities for the support, establishment and maintenance of calls, data transfer sessions and other communications, including for example, such parameters as security and authentication variables, location information, and the like.

The WLAN 200 hosts a limited IMS platform that is common to and interworks with the wireless IMS platform 106. The limited IMS platform incorporates or interfaces with certain physical and functional entities such as a HSS 202, IP-PBX 206, Wi-Fi access point 208, presence manager (PM) 210, telephony application server 212, voice mail service 214, media gateway 216, and an enterprise-side PDG 220, all connected via any suitable data link medium 222. HSS 202 facilitates authentication, authorization, and accounting (AMA) services via a DIAMETER protocol, thereby supporting mobile IP, accounting, network access, and security, and providing a framework for services requiring AAA policy support across multiple networks to achieve access and authentication. The HSS 102, 202 may further enable the respective network 100, 200 to offer subscribers advanced services and features by providing additional links and reference points that facilitate interfacing with external service application servers. The HSS 202 initiates location update procedures with HSS/HLR 102 and serves as a VLR to route mobile terminated calls from HPLMN 100 to the WiFi access point 208 via the MGW 216 function of the enterprise side IMS platform.

Domain Name Server (DNS) ENUM elements 104, 204 hosted by the enterprise WLAN 200 and in HPLMN 100 translate or otherwise map E.164 subscriber identifiers to and from Internet Protocol (IP) address formats such as a SIP address, Uniform Resource Identifier (URI), and the like, and are synchronized to maintain active E.164 routing information for dual mode service (DMS) subscribers. For PSTN to mobile terminated calls, the PSTN also utilizes the ENUM elements 104, 204 to look up the SIP address or temporary routing number associated with the E.164 dialed, queries the PM 110, 210 for the ability to route the call directly to the SIP address or the temporary routing number.

PDG 120, 220 functions much like a GGSN in a 3G packet-switched network. It routes user data traffic between the DMH H and a packet data network (PDN) operated by the respective network 100, 200 according to the specific service requested by the DMH H (e.g., WAP, MMS, IMS, and the like). PDG 120, 220 may perform additional functions, such as address translation, policy enforcement, generation of call detail or other charging records, and the like.

The TAS 212 may include, inter alia, a SIP registrar—which is the primary VoIP subscriber database that is queried by other elements to determine whether the subscriber is active and receiving calls in the WLAN 200, a VoIP feature server—which provides voice call control and processing via SIP, and a WLAN subsystem.

Figure 2:
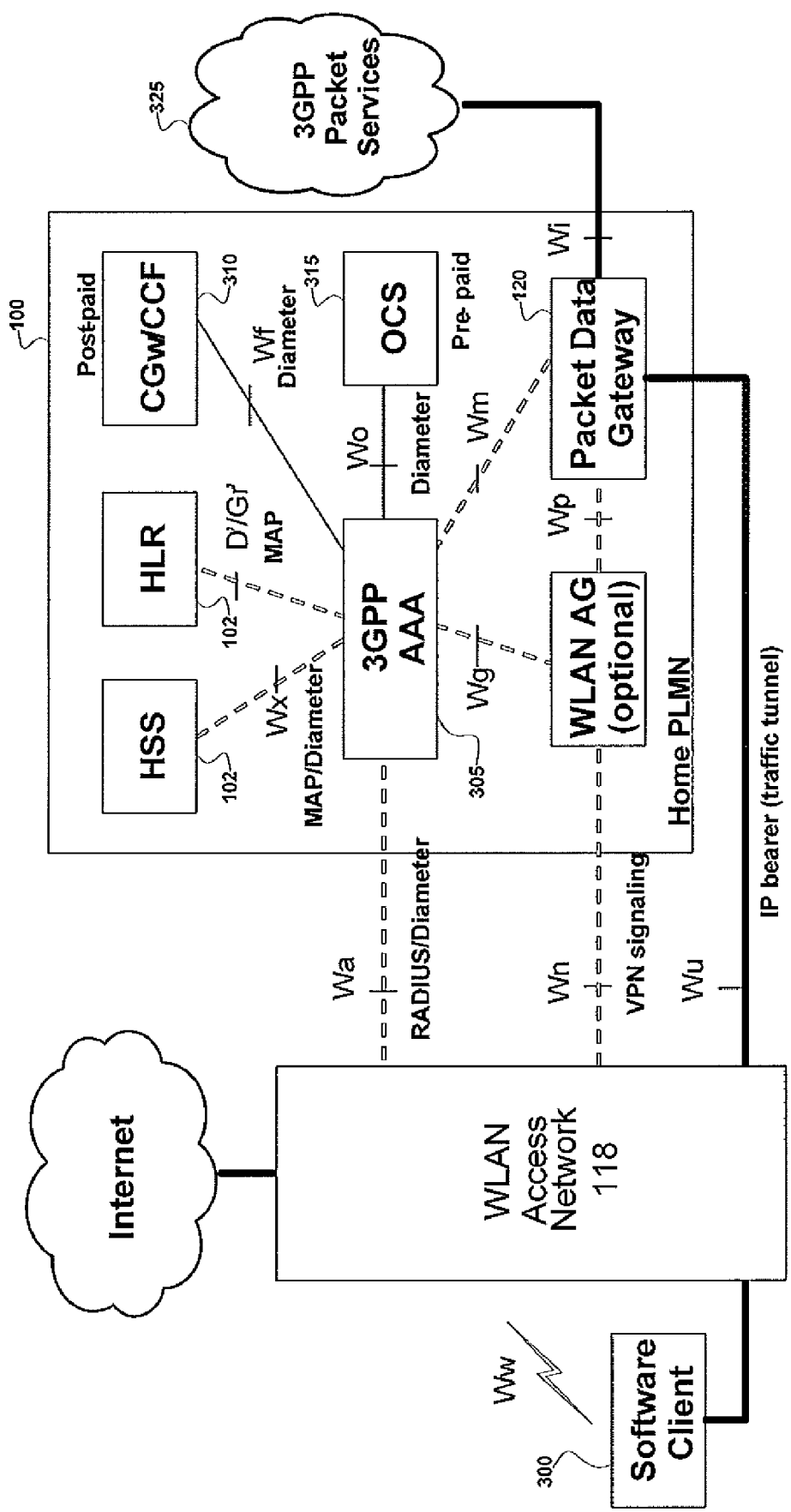
FIG. 2 is a block diagram showing an exemplary 3GPP WLAN Subsystem.

With reference to FIG. 2, the PDN may be an external public or private packet data network, or an intra-operator packet data network. Interworking between the PDN via the PDG 120 is provided via the Wi interface using IP protocols.

As used herein, the term "gateway" refers to a network node equipped for interfacing with another network that uses at least one different protocol, or performing such an interface. A gateway may contain devices such as protocol translators, impedance matching devices, rate converters, fault isolators, or signal translators as necessary to provide system interoperability. For example, media gateway (MGW) 116, 216 interfaces with the media plane of the respective network 100, 200 by converting between transport protocols, such as real time transport protocol and PCM. A gateway can also transcode when codecs fail to correlate (e.g., an IMS may use AMR, the PSTN might use G.711). GMSC 124 is a telecommunications switch or exchange that provides an EDGE function within the HPLMN 100, terminates PSTN signaling and traffic formats, and converts the same to protocols employed in mobile networks. For mobile terminated calls, the GMSC 124 interacts with HLR 126 and HSS/HLR 102 to obtain routing information.

The subscriber operating the DMH H is assigned a subscriber identifier that gateways through the enterprise WLAN 200, which identifies itself by broadcasting a single service set identifier (SSID). It should be noted that multiple SSIDs can be supported by a single IEEE 802.11 WLAN, although only one is broadcast. Because the subscriber essentially is considered to subscribe to both networks 100, 200, inter alia, this subscriber identifier is maintained in association with a subscriber record in each network 100, 200, and is associated in the exemplary embodiment with credentials stored on a smart card, such as a Subscriber Identity Module (SIM) or User Services Identity Module (USIM).

In the WLAN 200, the subscriber record comprises a WLAN user profile which resides in HSS 202, although if the operator uses a legacy HLR the WLAN user profile may reside in a 3GPP AM Server 305 (FIG. 2), for retrieval via a Wx reference point. A WLAN user profile may contain, inter alia, a unique non-dialable number allocated to each mobile subscriber in a PLMN that identifies the subscriber and his or her subscription within the PLMN (e.g., the International Mobile Subscriber Identity (IMSI) Number), and a dialable number that callers use to reach a mobile subscriber (e.g., the Mobile Subscriber ISDN (MSISDN) Number), which further identifies the subscriber, for example for charging purposes. In addition, or in place of the MSISDN, the subscriber record includes the aforementioned subscriber identifier, which in the exemplary embodiments, is an E.164 number that is substantially identically provisioned in the subscriber records maintained in the HPLMN 100.

Access to PLMN Packet Switched Services

The operator of the HPLMN 100 may provide certain packet-switched services to its subscribers. Certain types of services are made available to the subscriber while operating the DMH H in either the HPLMN 100 or WLAN 200, with the services being routed via the WLAN 200 to take advantage of the single E.164 system of the present invention. Examples of services contemplated include Message Waiting Indicator (MWI) Delivery, which can be delivered via SMS over SMPP (see, for example, the External Short Message Entity (ESME) DIRECT CONNECT service provided by Cingular Wireless), as well as enterprise Voice Mail Service (VMS) which can be provided via the VMS 214 platform located in the WLAN 200 while the DMH H is in both the WLAN 200 and the HPLMN 100. Enterprise SMS services are also provided when the DMH operates on the WLAN 200.

To provide such access, subscriber data traffic is tunneled between the WLAN 200 and the subscriber's home HPLMN 100 utilizing the 3GPP WLAN Substem standard ("3*GPP System to Wireless Local Area Network (WLAN) interworking; System Description*," TR 23.234 Release 6, hereby incorporated by reference), which enables WiFi to become a bearer into 3GPP network. With reference to FIG. 2, the 3GPP WLAN subsystem will now be described to illustrate certain aspects of the invention in the context of SIM authentication and provision of two-way SMS service in the HPLMN 100 or in the WLAN 200.

The DMH H includes a software client 300 that maintains an IP session with the 3GPP WLAN Subsystem 118 via a WLAN Access Network such as the WiFi network 208 of WLAN 200 to enable SMS service in the WLAN 200. A key element in the architecture of FIG. 2 is the 3GPP AAA server 305, which is a functional element of a 3G PLMN that supports interworking with WLANs. The 3GPP AAA server 305 enables the DMH H to use WiFi access in the WLAN 200 as a bearer to access packet-based services. The 3GPP AAA server 305 terminates all AAA signaling with the WLAN 200 and interfaces with other 3G components, such as HSS/HLR 102, charging gateway/charging collection function (CGw/CCF) 310, and online charging system (OCS) 315. The CGw/CCF 310 and the OCS 315 are 3G functional elements used to provide offline (e.g., post-paid) and online (e.g., pre-paid) charging services, respectively. The 3G AAA server 305 acquires subscription information for particular DMHs H from the HSS/HLR 102. A 3G AAA server also has the capacity to route AAA signaling to and from another 3G PLMN, in which case it serves as a proxy and is referred to as a 3G AAA proxy. In FIG. 2, a 3G AAA server in the WLAN Access Network 208 fulfills the role of an AAA proxy, routing AAA signaling to and from the 3G AAA server 305. The 3G AAA proxy identifies the IP address of the 3G AAA server 305 by using the network address identifier (NAI) transmitted by the DMH H.

User data traffic is routed to PDG 120, which routes user data traffic between the DMH H and an external packet data network (PDN), which is selected based upon the packet-switched service requested by the DMH H, e.g., SMS. Routing is enforced by establishing appropriate tunnels via reference points illustrated as interfaces Wa, Wi, Wn, Wu, Wx, D'/Gr', Wf, Wo, Wg, Wp, and Wm, which utilize appropriate protocols, including RADIUS (Remote Authentication Dial In User Service), DIAMETER, VPN signaling, MAP, and the like as is known in the art. For example, the Wg interface permits the 3GPP AAA server 305 to deliver routing policy enforcement information to the optional WLAN AG 118 in order to identify user data traffic and to apply appropriate routing policy. The Wp interface transports tunneled user data traffic to and from the PDG 120. The Wm interface permits the 3GPP AAA server 305 to retrieve tunneling attributes and the IP configuration parameters of DMH H via DIAMETER. The Wx interface permits access to WLAN subscriber profiles, and retrieval of authentication vectors via either MAP or DIAMETER protocols. The D'/Gr' interface optionally exchanges subscription information between the 3GPP AAA server 305 and the HLR function of HLR/HSS 102 via MAP protocol. The Wi interface routes traffic between the DMH H and the PDN based upon the selected service (e.g., SMS, WAP, MMS, IMS, and the like).

SS7 Delivery

Figure 3:
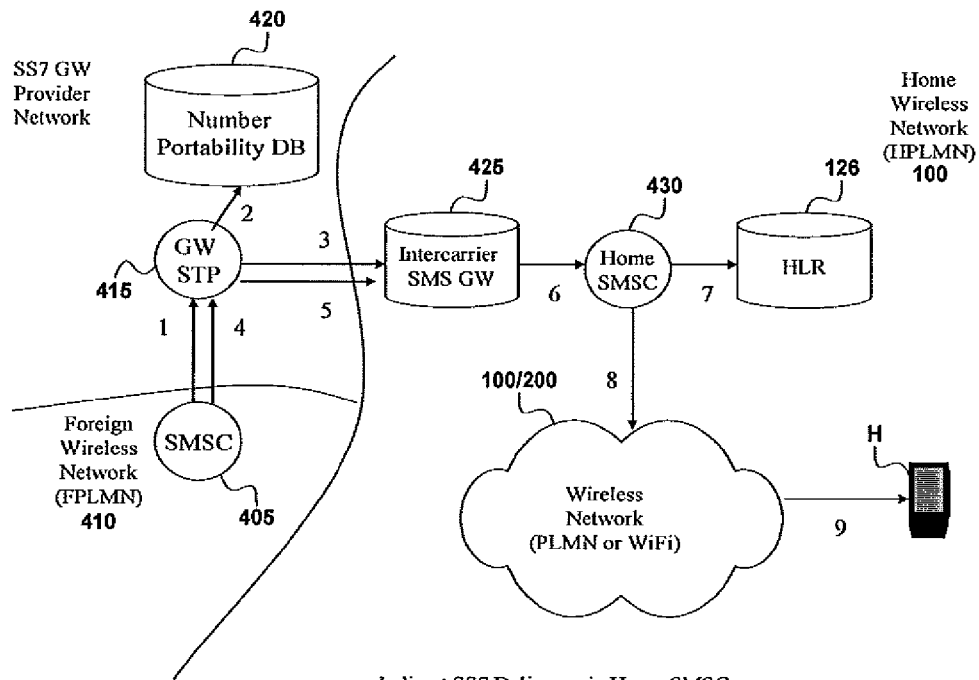
FIG. 3 is a block diagram showing indirect delivery of SS7 signaling messages via a foreign short message center.
Figure 4:
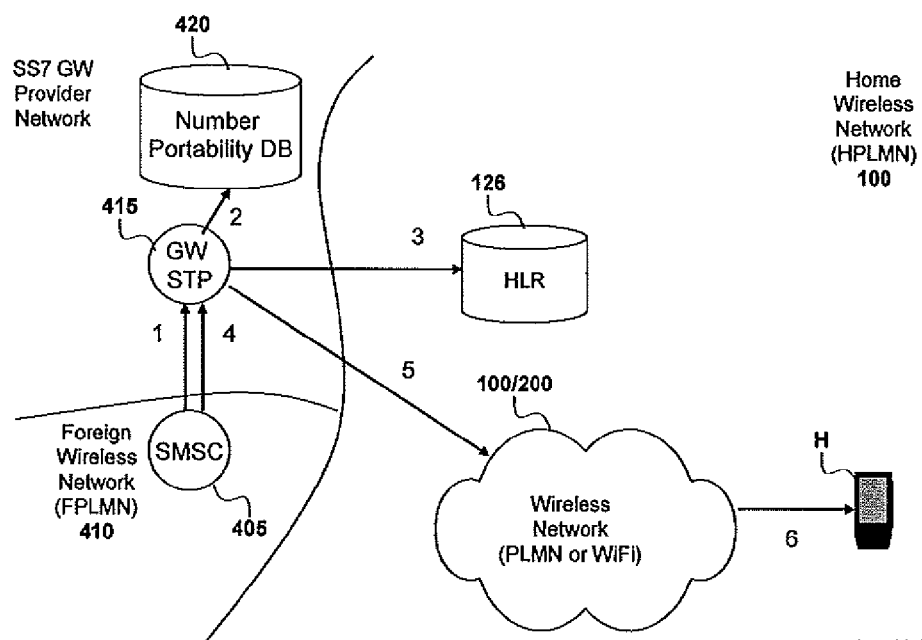
FIG. 4 is a block diagram showing direct delivery of SS7 signaling messages via a foreign short message center.
Figure 5:
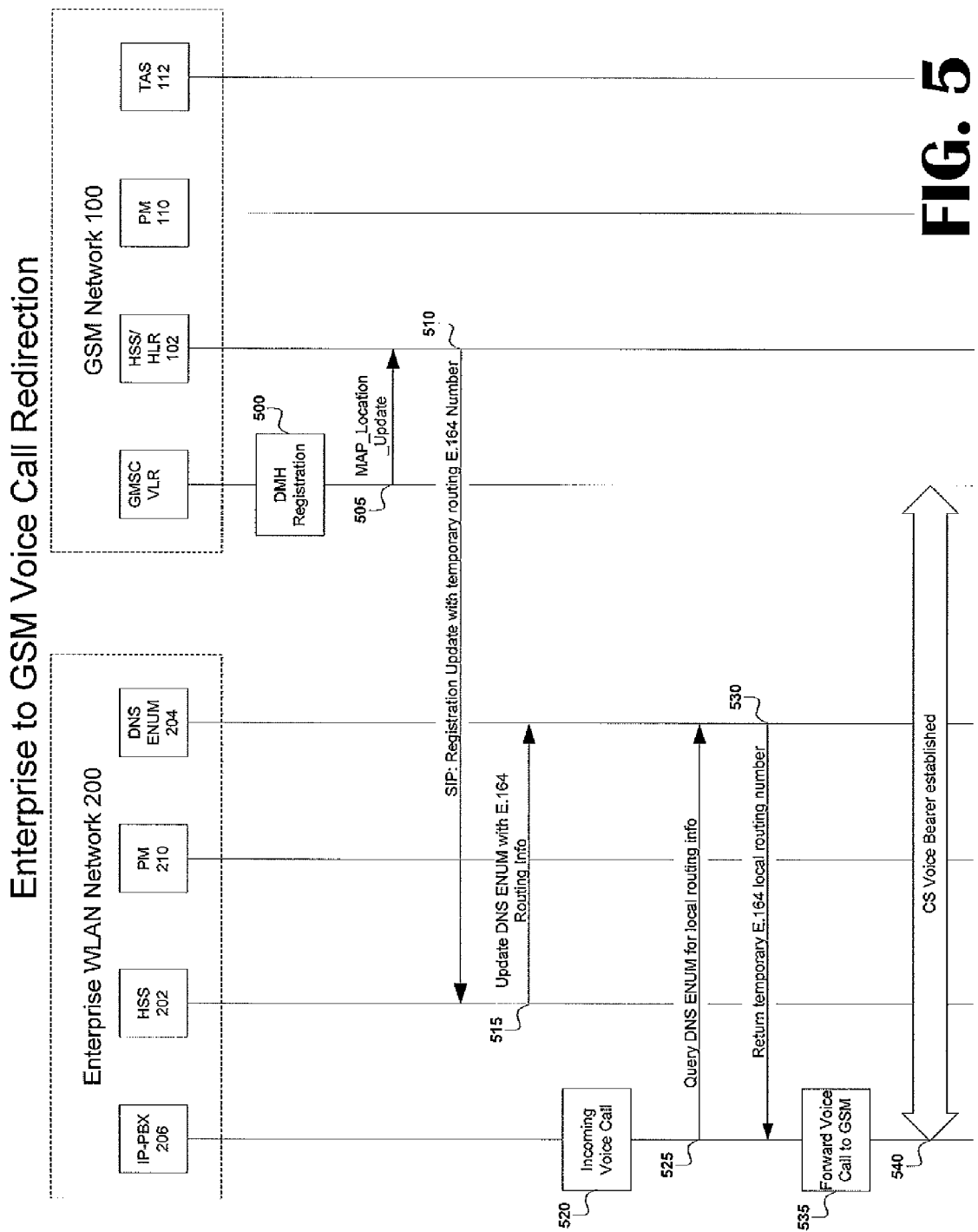
FIG. 5 is a flow diagram showing an exemplary method for call redirection according to an embodiment of the invention.

Moreover, SS7 signals can be delivered to the DMH H operating in the HPLMN 100 without providing the WLAN 200 direct access to the SS7 network. More specifically, SS7 signals can be directly or indirectly delivered in the HPLMN 100 using SMS messages via the subscriber's home or a foreign Short Message Service Center (SMSC). As shown in FIGS. 3 and 4, the SMSCs 405, 430 of the present invention are routing devices of a type that is well known in the art. Each SMSC 405, 430 comprises a microprocessor and memory, and functions as a clearinghouse and depository for receiving, delivering, and temporarily storing SMS data between users and wireless application servers without establishing circuits therebetween. Referring now to FIG. 3, SS7 messages are delivered indirectly to the DMH H via the SMSC 430 in its home HPLMN 100, primarily according to the principles of the following process:

1. An SMS generated in a foreign PLMN (FPLMN) 410 causes the SMSC 405 to send a request for SMS routing information (e.g., SEND_ROUTING_INFO (SRI_SM)) to the network of the provider of an SS7 gateway switching transfer point (GW STP) 415.
2. The SS7 GW STP 415 interrogates a Number Portability Database (NPDB) 420 in the SS7 gateway network to determine the identity of the destination network, which in the exemplary embodiment is the HPLMN 100. The NPDB 420 replies, identifying the network operator and the HPLMN 100.
3. The GW STP 415 forwards the SRI_SM to an intercarrier SMS GW 425 in the now identified HPLMN 100.
4. The foreign SMSC 405 sends the SMS to the GW STP 415 for indirect delivery to the associated HPLMN 100 via the intercarrier SMS GW 425.
5. The GW STP 415 forwards the SMS to the intercarrier SMS GW 425 in the HPLMN 100.
6. The intercarrier SMS GW 425 delivers the SMS to the SMSC 430 in the HPLMN 100 (the "home SMSC").
7. The home SMSC 430 interrogates the HLR 126 to determine the status and/or location of the DMH H. More specifically, the HLR 126 indicates whether the DMH H is operating and if so, whether the DMH H is operating in the HPLMN 100, in a visited PLMN (not shown), or in the WiFi WLAN 200.
8. The home SMSC 430 sends the SMS to the wireless network identified in step 7.
9. The wireless network delivers the SMS to the DMH H via the protocol dictated by its network type. For example, if the DMH H is operating in the WLAN 100, a FORWARD_SHORT_MESSAGE procedure is initiated and forwarded to an SMS message handler (not shown), which processes the message content and sends it to a SIMPLE server, which delivers the SMS via a SIP:MESSAGE to the DMH H.

Alternatively, SMS messages can be delivered to the DMH H directly via its home SMSC for example as follows, with reference to FIG. 4.

1. An SMS generated in a foreign PLMN (FPLMN) 410 causes the SMSC 405 to send a request for SMS routing information (e.g., SRI_SM) to the network of the provider of an SS7 gateway switching transfer point (GW STP) 415.
2. The SS7 GW STP 415 interrogates a Number Portability Database (NPDB) 420 in the SS7 gateway network to determine the identity of the destination network—the HPLMN 100. The NPDB 420 replies, identifying the network operator and the HPLMN 100.
3. The GW STP 415 forwards the SRI_SM to the HLR 126 to determine the status and/or location of the DMH H. More specifically, the HLR 126 indicates whether the DMH H is operating and if so, whether the DMH H is operating in the HPLMN 100, in a visited PLMN (not shown), or in the WiFi WLAN 200.
4. The foreign SMSC 405 sends the SMS to the GW STP 415 for direct delivery to the associated HPLMN 100. The GW STP 415 includes or interfaces with a signaling gateway SMS message handler.
5. The GW STP 415 delivers the SMS to the HPLMN 100.
6. The wireless network delivers the SMS to the DMH H via a suitable protocol according to its network type. For example, if the DMH H is operating in the WLAN 100, the SMS may be converted to a SIP IP Multimedia message.

As demonstrated above, typical SMS messages can be separated from those containing SS7 content via the message handler (not shown), which can read or scan every incoming message to ascertain whether or not the incoming message contains SS7 content. Preferably, the message handler searches the text of the message for one or more keywords, which may be maintained in general library of keywords stored in its memory. Accordingly, when the message handler detects SS7 signaling content in the text of an incoming message, the message handler routes the SS7 content in the HPLMN 100.

Call Redirection

The networks 100, 200 may use 3GPP Voice Call Continuity or the like to maintain persistent IP sessions when transitioning between a circuit-switched (CS) network and IMS to support voice call handovers between the circuit-switched HPLMN 100 and the packet-switched VoIP based WLAN 200. The DMH H preferably automatically detects and selects the appropriate and optimal network, and the respective authentication and access control protocols of the disparate networks 100, 200 are supported. However, handover of ongoing calls is not described in detail herein; rather the systems and methods of the invention are described primarily in relation to redirecting incoming calls through the WLAN 200 to the DMH H operating in the HPLMN 100 after handover has occurred.

If the DMH H is operating in the WLAN 200, an incoming call directed to the DMH H is routed in the enterprise directly to the DMH H, for example using a SIP INVITE message that identifies the DMH H as the destination to which to route the call. However, when the DMH H exits the WLAN 200 and begins operating in the HPLMN 100, incoming calls are redirected to the new location of the DMH H.

The DMH H automatically detects the accessibility of the HPLMN 100, and selects the HPLMN 100 over the WLAN 200 according to any suitable rule set that may incorporate business logic (e.g., time of day, day of week, or cost) and assessment of the availability and relative signal strength of the WLAN and PLMN signals and analysis of hysteresis or other algorithms. To redirect a call to the DMH H (a DMH terminated call) when the DMH H disconnects from the WLAN 200 and registers in the HPLMN 100, location update procedures native to the HPLMN 100 are used to update the visited HLR E.164 address that will point to the HSS/HLR 102. In certain embodiments, the location update procedures used mimic a pseudo-MVNO configuration that uses circuit-switched call control and packet-switched signaling protocols to update presence. Typically, a secondary common carrier such as a Mobile Virtual Network Operator (MVNO) purchases an exclusive line at a wholesale price from a primary common carrier, such as the PLMN operator, and sells ancillary data services or value-added services to a group of subscribers. Here, the DMH H is such a subscriber, and the WLAN 200 operating as a pseudo-MVNO connects to the HPLMN 100. The DMH H accessing the WLAN 200 can use the ancillary services even though the WLAN 200 itself does not have a function to support the DMH H while it operates in the HPLMN 100.

More specifically, and with reference to FIG. 3, an exemplary method for redirecting a DMH terminated call is shown. The exemplary method is shown and described as a series of steps, although those skilled in the art will recognize that the steps may be performed in various alternate sequences, that certain steps may be performed concurrently, that certain steps may incorporate various other steps, and that certain steps may be consolidated, omitted, or substituted. Therefore, the exemplary method is a non-limiting example provided to promote an understanding of the teachings and principles of the invention. At step 500, a DMH H moves from the WLAN 200 to the HPLMN 100. To enable call redirection in a manner that is transparent to the user, the DMH H registers in the HPLMN 100 by performing a location update procedure as is known in the art, such as by generating and passing a Message Application Part (MAP) signaling message including the parameter LOC_UPD_REQ. Certain embodiments support mediation of NPA splits, number portability and pooling, such that the applicable gateway exchange switch determines whether the E.164 number associated with the DMH H is in a split or pooled market and whether it has been ported. In direct or indirect implementations, the respective gateway exchange of the originating network or of the network that corresponds to the owner of the number block consults a remote database, such as a Number Portability database (NPDB) (not shown). The NPDB responds with the appropriate temporary Local Routing Number (LRN), preferably in E.164 format. An Initial Address Message (IAM) is formulated with the LRN retrieved from the NPDB populated in the CdPN (Called Party Number). It is this LRN that identifies the home network. The HSS/HLR 102 requires intelligence to detect whether the DMH H is registered in the HPLMN 100 as opposed to another PLMN (not shown). If the DMH H is registered in another PLMN, then the HSS/HLR 102 functions as a visited Public Land Mobile Network (VPLMN), and the HSS/HLR 102 includes VLR functionality so as to perform a GSM location update to the home PLMN (HPLMN). When acting as a HPLMN, the HSS/HLR 102 includes HLR functionality to provide subscriber records to the VPLMN.

The method proceeds to step 505, where the IAM containing the location update result is routed from the GMSC 124 via a switching transfer point 128 to be processed by the HSS/HLR 102. This triggers a notification to the wireless Presence Manager 110. The Presence Manager 110 retrieves or otherwise receives the routing information, for example with another MAP message via the HSS/HLR 102 and, at step 510, updates the Presence Manager 210 and HSS 202 in the WLAN 200 using a SIP message. At this point, the Presence Manager 210 and HSS 202 possess the routing information needed to redirect the DMH terminated calls from the WLAN 200 to the HPLMN 100.

At step 515, the HSS 202 updates the DNS ENUM 204 with the current routing information, including the temporary LRN. In the exemplary embodiments, the DNS ENUM 204 translates a SIP address, e.g., "user@sip.com" associated with the user to local routing information corresponding to the temporary LRN. This procedure may be used to redirect voice calls to a third generation (3GPP) WLAN destination such as the subscriber's residential network via 3GPP WLAN connection 118.

At step 520, the incoming voice call is placed and is routed through the WLAN 200. At step 525, the IP-PBX 206 queries the DNS ENUM database 204 for the local routing information. At step 530, the DNS ENUM database 204 responds to the query by returning the temporary LRN. At step 535, the call is forwarded to the HPLMN 100, for example, using an SS7 point to point ISDN User Part (ISUP) forwarding procedure. At step 540, a circuit-switched voice bearer is established between the IP-PBX 206 and the GMSC 124 in the HPLMN 100. Alternatively, an IP session is established.

According to another exemplary method of the invention, when a DMH H registers in the WLAN 200, a SIP registration procedure triggers a notification to the Presence Manager 110. The Presence Manager 110 initiates a MAP Location Cancel procedure via the HSS/HLR 102. This procedure causes DMH terminated calls originated in the HPLMN 100 to be routed through the PSTN to the WLAN 200. Alternatively, the DMH H may register in the HPLMN 100 through the 3GPP WLAN Subsystem 118. In this scenario, voice calls can be routed from the HPLMN 100 directly to the PSTN (and thus, to the WLAN 200) via the WiFi access point connection 208. Thus, the use of broadband and optimal routing to transport voice calls in a transcoder free environment is also contemplated.

Caller Identification

For calls originated from the DMH H, the E.164 subscriber identifier is also used by the caller identification protocol associated with the active network to identify the subscriber. The E.164 subscriber identifier associated with the DMH H is hosted by the enterprise's serving wire center (end office) and is routed directly from the PSTN to the WLAN 200. The subscriber identifier is also provisioned in the HPLMN 100 as if belonging to a MVNO roaming partner. Thus, the active network retrieves the subscriber identifier from its internal subscriber record and utilizes this identifier to identify the DMH using native caller identification protocols.

Those skilled in the art will comprehend that the routing for this call flow may require a separate and unique E.164 number for voice mail to prevent looping especially when the DMS handset is registered in the HPLMN 100, but is unable to accept DMH terminated voice calls.

The dual mode handset maintains persistent IP connections with the 3GPP-WLAN Subsystem while registered in the Enterprise WLAN 200 to enable WiFi access to IMS and data services, such as GPRS, typically provided by the PLMN operator.

The foregoing has broadly outlined some of the aspects and features of the present invention, which should be construed to be merely illustrative of various potential applications of the invention. Other beneficial results can be obtained by applying the disclosed information in a different manner or by combining the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

The present invention has been illustrated in relation to particular embodiments which are intended in all respects to be illustrative rather than restrictive. Those skilled in the art will recognize that the present invention is capable of many modifications and variations without departing from the scope of the invention. For example, as used herein, the term PLMN and the phrase "wireless network" refer to a wireless telecommunications network, such as a GSM network, although any suitable type of wireless network or air interface technology for transmitting and receiving voice and/or data, is contemplated, including TDMA, CDMA, UMTS, and the like. The term "WLAN" refers to any suitable wireless local area network, such as but not limited to a 3GPP network or a 3GPP2 network in embodiments that interwork with CDMA-based networks.

Those skilled in the art will also appreciate that the systems and methods of the invention are adaptable to accommodate the exigencies of the particular service provider or network. For example, as described, not all elements, protocols, and procedures will optimize performance and reliability in every system. For example, the Enterprise WLAN may have to retrieve the GSM E.164 routing information from the HSS/HLR for each incoming voice call. Existing network components may require addition or modification of functionality. For example, new functionality may be required in the HSS/HLR elements to enable presence notification using the GSM E.164 routing information. Accordingly, the scope of the present invention is described by the claims appended hereto and supported by the foregoing.

What is claimed is:

1. In an enterprise wireless local area network (WLAN), a method for redirecting an incoming call to a dual mode device, the method comprising:

receiving, at a first subscriber database in the enterprise WLAN, a registration update indicating that the dual mode device is registered in a wireless telecom network, the registration update being received from a second subscriber database in the wireless telecom network in response to the dual mode device being registered with the wireless telecom network, and the registration update comprising temporary routing information used to route incoming calls received at the enterprise WLAN via an enterprise switching system to the dual mode device;

updating the first subscriber database with the temporary routing information, in response to receiving the registration update;

receiving, at the enterprise switching system, notification of an incoming call directed to the dual mode device;

retrieving the temporary routing information from the first subscriber database; and connecting the incoming call to the dual mode device in the wireless telecom network using the temporary routing information.

2. The method of claim 1, wherein connecting the incoming call to the dual mode device comprises establishing a bearer with the wireless telecom network to deliver the incoming call.

3. The method of claim 1, wherein updating the first subscriber database in response to receiving the registration update comprises translating the temporary routing information into an address routable in the enterprise WLAN.

4. The method of claim 3, wherein translating the temporary routing information comprises translating a temporary routing number to a H.323 address.

5. The method of claim 3, wherein translating the temporary routing information comprises translating a temporary routing number to a Session Initiation Protocol (SIP) address.

6. The method of claim 1, wherein connecting the incoming call to the dual mode device comprises generating a signaling message recognizable in the wireless telecom network, the signaling message including the temporary routing information, and transmitting the signaling message as a text message.

7. A method for routing a mobile terminated call to a dual mode device, the method comprising:

receiving a mobile terminated call at an enterprise switching center in an enterprise wireless local area network (WLAN), the enterprise switching center providing a gateway function for all mobile terminated calls;

determining that the dual mode device is operating in a Public Land Mobile Network (PLMN);

retrieving a temporary routing number from an enterprise subscriber record, the temporary routing number identifying the PLMN, and the temporary routing number having been previously received from the PLMN in response to the dual mode device registering in the PLMN; and routing the call to the PLMN using the temporary routing number.

8. A method for providing a telephony service to a dual mode device operable in an enterprise wireless local area network (WLAN) and in a wireless telecom network, the method comprising:

associating a single unique subscriber identifier with the dual mode device;

provisioning the dual mode device in the enterprise WLAN by storing the subscriber identifier in a first subscriber record in a subscriber database associated with the enterprise WLAN;

provisioning the dual mode device in the wireless telecom network by storing the subscriber identifier in a second subscriber record in a subscriber database associated with the wireless telecom network;

in response to a request for the telephony service, determining, at an enterprise switching system, if the dual mode device is operating in the enterprise WLAN or the wireless telecom network; and if it is determined that the dual mode device is operating in the enterprise WLAN, retrieving the subscriber identifier from the first subscriber record and providing the telephony service according to a protocol used by the enterprise WLAN.

9. The method of claim 8, further comprising:

if it is determined that the dual mode device is operating in the wireless telecom network, retrieving the subscriber identifier and a temporary routing number previously received from the second subscriber record and stored in the first subscriber record; and providing the telephony service according to a protocol used by the wireless telecom network.

10. The method of claim 8, wherein providing the telephony service comprises providing a telephony service that is subscriber identity reliant.

11. The method of claim 8, wherein providing the telephony service comprises providing a telephony service that identifies the dual mode device.

12. The method of claim 8, wherein providing the telephony service comprises providing a Caller Identification service such that the subscriber identifier is used as the calling party number for calls terminating in the enterprise WLAN and the wireless telecom network.

13. The method of claim 8, wherein providing the telephony service comprises providing Voice Mail Service.

14. The method of claim 8, wherein associating a unique subscriber identifier with the dual mode device comprises associated an E.164 number with the dual mode device.

15. The method of claim 9, wherein providing the telephony service comprises redirecting an incoming call from the enterprise switching system to a serving mobile switching center identified by the temporary routing number.

* * * * *